E. J. WHITE.
TOOL HOLDER.
APPLICATION FILED OCT. 26, 1912.
1,092,615.
Patented Apr. 7, 1914.
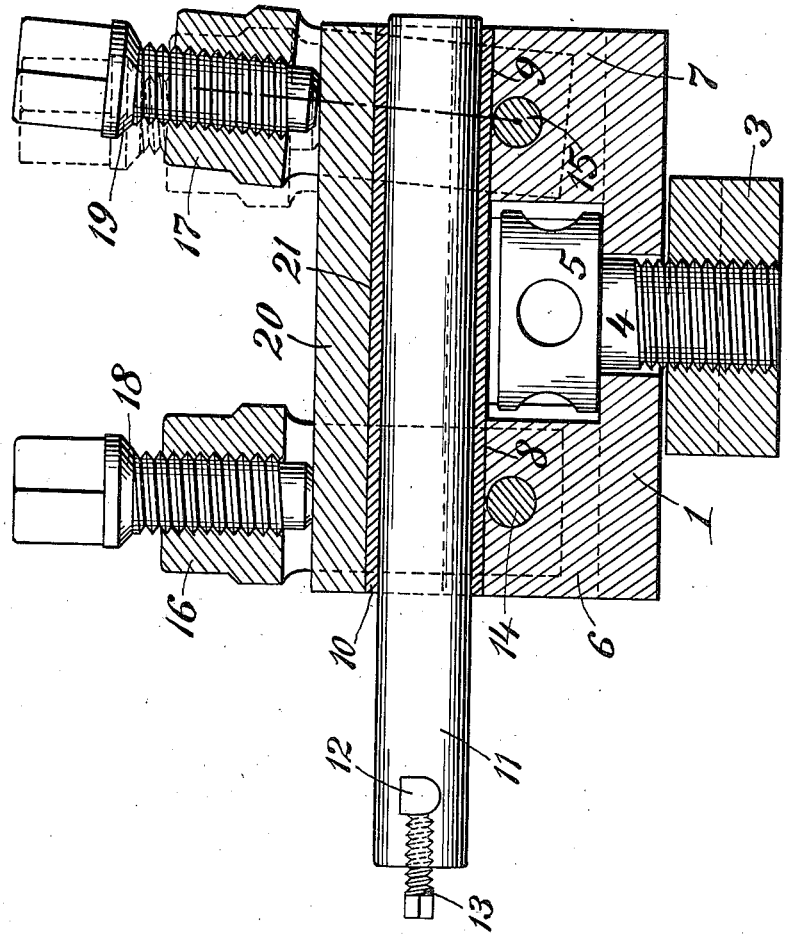
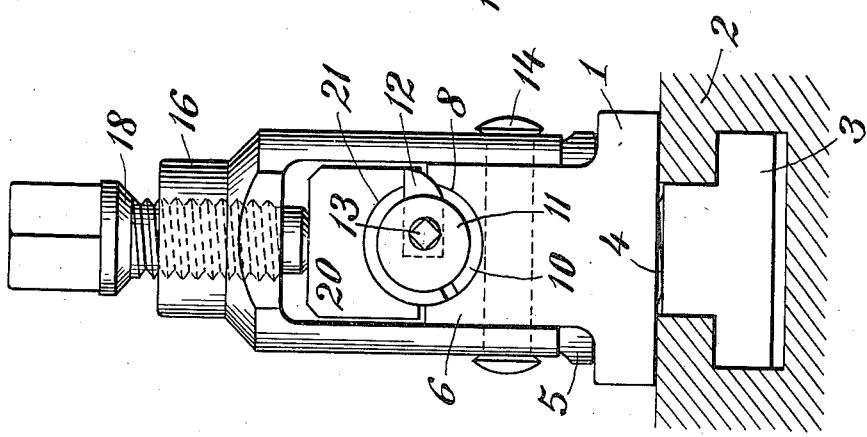
Witnesses:
Edmund Quincy Moses
Gerald E. Terwilliger
Edward J. White Inventor
By his Attorney
Seward Davis
COLUMBIA PLANOGRAPH CO., WASHINGTON, D. C.

UNITED STATES PATENT OFFICE.

EDWARD J. WHITE, OF NEWARK, NEW JERSEY.

TOOL-HOLDER.

1,092,615.  Specification of Letters Patent.  Patented Apr. 7, 1914.

Application filed October 26, 1912.  Serial No. 727,859.

*To all whom it may concern:*

Be it known that I, EDWARD J. WHITE, a subject of the King of Great Britain, residing in the city of Newark, county of Essex, and State of New Jersey, have invented certain new and useful Improvements in Tool-Holders, of which the following is a specification.

My invention relates to a device for clamping in position tools commonly used for cutting purposes, such as those adapted for service in connection with lathes, boring engines and the like, and has particular reference to holders for tools designed for high cutting duty, where very heavy stresses are brought to bear upon the tool and consequently upon the means employed for clamping it in position.

Much difficulty has been experienced with the tool holders already in use from the fact that the rigid mounting which they afford frequently results in the bending or other failure of the clamping means itself owing to the rigidity of the structure. In my improved device I have designed clamping means which provides more than the usual rigidity, but which also automatically adjusts itself so as to minimize the internal strain of the clamp, while at the same time increasing its efficiency in service and flexibility of use. This I accomplish by pivotally mounting certain of the clamping members with relation to the stationary parts.

In the accompanying drawings which form a part of this specification, Figure 1 is a transverse sectional view of my improved device, and Fig. 2 is an end view thereof.

Referring to the drawings in detail, the numeral 1 designates a base adapted to be clamped to the bed-plate or universal head 2 of a lathe, boring engine or other device, by any suitable means such as the T-clamp 3 and bolt 4 having the head 5. The base 1 is provided with two upright pillars 6 and 7 provided with the alined semi-circular grooves 8 and 9 for the reception of a split ring 10 embracing the shank of a tool 11. This tool may be of any character, but I have shown for purposes of illustration a boring tool having the replaceable cutting portion 12 received within the shank of the tool and held in place by means of a set screw 13, but it will be obvious that the form of the tool itself is immaterial.

Mounted upon the two fixed or stationary uprights by means of pivots 14 and 15 are the pillars 16 and 17, respectively, which are of skeleton configuration and forked to embrace the fixed uprights, as clearly shown in Fig. 2. The heads of the pillars are provided with centrally disposed threaded portions through which pass the bolts 18 and 19 which bear against an upper clamping member 20. This member is provided with a semi-circular groove 21 in its lower face adapted to bear against the split sleeve 10.

When it is desired to clamp a tool in position, the tool is adjusted as desired in the usual manner within the sleeve 10 and the bolts 18 and 19 securely tightened. The effect of tightening these bolts will be to cause the pivoted pillars, whatever their original position, to aline themselves properly with relation to the rest of the structure, as shown in Fig. 1. If either or both of the pillars are offset from the perpendicular, as shown in full lines at the right of Fig. 1, the tightening of the bolts will exert upon the pillar which is out of line a component force tending to rotate the same about its pivot, and this force will continue to act, though with diminishing effect, until a close approximation to the theoretical perpendicular is attained, as indicated by the dotted lines in Fig. 1. Eccentric strains upon either of the pillars or their bolts are thus obviated and no tendency to bend the bolts or to shatter the pillar, such as are frequently found in practice in tool holders having fixed clamps, can be present after the bolts are tightened against the upper clamping member. Furthermore, as the centers of the pivots 14 and 15 are preferably equidistant from the center line of the means which secures the fixed standard in place, the stresses and strains are distributed symmetrically through the structure and the highly undesirable eccentric forces done away with.

While I have illustrated and described only one specific embodiment of my device, I realize that it is susceptible of wide variation, and I do not desire to be limited to the precise structure shown and described.

Having thus described my invention, I claim:

A holder for tools and the like comprising a stationary member having a pair of spaced, fixed uprights, a pair of forked pillars having their forked ends embracing said uprights, means for pivoting the lower extremities of the legs of each of said pillars to said uprights, pressure-applying means mounted in the free end of each of said pillars and adapted to distribute strain along the line of said pillars and said uprights, means for attaching the holder to the machine with which the holder is adapted to be used, said attaching means being located centrally between said uprights and out of the line of pressure of said pressure-applying means, whereby the strain upon said attaching means is obviated, and a second member adapted to be located between a tool and the pressure-applying means, and to transmit the strain from said forked pillars to said uprights.

EDWARD J. WHITE.

Witnesses:
  FRANCIS CHILD, Jr.,
  GERALD E. TERWILLIGER.